United States Patent
Harada et al.

[11] Patent Number: 6,072,059
[45] Date of Patent: Jun. 6, 2000

[54] HEAT DEVELOPMENT IMAGE FORMING PROCESS AND HEPTAMETHINE CYANINE COMPOUND

[75] Inventors: Toru Harada; Itsuo Fujiwara; Minoru Sakai, all of Kanagawa, Japan

[73] Assignee: Fuji Photo Film Co., Ltd., Kanagawa, Japan

[21] Appl. No.: 09/010,509

[22] Filed: Jan. 21, 1998

[30] Foreign Application Priority Data

Jan. 21, 1997 [JP] Japan ................................ 9-009001
Jul. 11, 1997 [JP] Japan ................................ 9-202461

[51] Int. Cl.[7] .................. C07D 487/04; C07D 487/14
[52] U.S. Cl. ................................ 548/455; 548/427
[58] Field of Search ........................ 548/427, 455

[56] References Cited

U.S. PATENT DOCUMENTS

| | | | |
|---|---|---|---|
| 4,876,181 | 10/1989 | Proehl et al. | 430/522 |
| 4,882,265 | 11/1989 | Laganis et al. | 430/522 |
| 4,959,294 | 9/1990 | Lea et al. | 430/204 |
| 5,290,670 | 3/1994 | Delprato et al. | 430/510 |
| 5,322,768 | 6/1994 | Delprato et al. | 430/522 |
| 5,541,055 | 7/1996 | Ooi et al. | 430/619 |

FOREIGN PATENT DOCUMENTS

| | | |
|---|---|---|
| 342576A1 | 11/1989 | European Pat. Off. . |
| 452853 | 10/1991 | European Pat. Off. . |
| 539786A1 | 5/1993 | European Pat. Off. . |
| 2-073344 | 3/1990 | Japan . |
| 5216167 | 8/1993 | Japan . |
| 5216171 | 8/1993 | Japan . |
| 7-11184 | 1/1995 | Japan . |

Primary Examiner—Laura L. Stockton
Attorney, Agent, or Firm—Birch, Stewart, Kolasch & Birch, LLP

[57] ABSTRACT

A heat development image forming process comprises steps of: imagewise exposing to light a heat developable light-sensitive material comprising a support, a light-sensitive layer and a non-light-sensitive layer, and then heating the light-sensitive material. The light-sensitive layer or the non-light-sensitive layer contains a heptamethine cyanine dye represented by the formula (I):

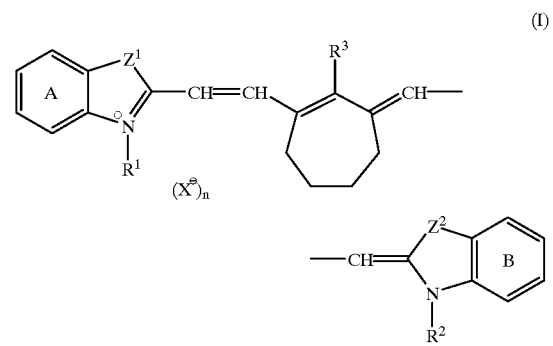

in which $Z^1$ is —$CR^{11}R^{12}$—, —O—, —S— or —$NR^{13}$—; $Z^2$ is —$CR^{21}R^{22}$—, —O—, —S— or —$NR^{23}$—; each of $R^1$ and $R^2$ independently is an alkyl group, a substituted alkyl group, an alkenyl group, a substituted alkenyl group, an aralkyl group or a substituted aralkyl group; $R^3$ is hydrogen, a halogen atom, an alkyl group, a substituted alkyl group, a cycloalkyl group, a substituted cycloalkyl group, an aryl group, a substituted aryl group, a heterocyclic group, a substituted heterocyclic group, cyano, —$SO_2R^{31}$, —$OR^{32}$, —$SR^{33}$ or —$NR^{34}R^{35}$; X is an anion; and n is 0 or 1.

5 Claims, No Drawings

HEAT DEVELOPMENT IMAGE FORMING PROCESS AND HEPTAMETHINE CYANINE COMPOUND

FIELD OF THE INVENTION

The present invention relates to a heat development image forming process and a heptamethine cyanine compound.

BACKGROUND OF THE INVENTION

A heat development image forming process has already been proposed, and is described in U.S. Pat. Nos. 3,152,904, 3,457,075, and B. Shely "Thermally Processed Silver Systems" (Imaging Processes and Materials, Neblette eighth edition, edited by Sturge, V. Walworth and A. Shepp, page 2, 1996).

A heat developable light-sensitive material used in the image forming process generally has a light-sensitive layer, which contains a catalytically active amount of a photo catalyst (e.g., silver halide), a reducing agent, a reducible silver salt (e.g., organic silver salt) and a color toning agent dispersed in a binder matrix. The color toning agent has a function of controlling color tone of silver. The process comprises steps of imagewise exposing to light the heat developable light-sensitive material, and then heating the light-sensitive material at an elevated temperature (not lower than 80° C.) to cause an oxidation-reduction reaction between the silver halide or the reducible silver salt (functioning as an oxidizing agent) and the reducing agent. Thus a black silver image is formed. The oxidation-reduction reaction is accelerated by a catalytic function of a silver halide latent image formed at the exposing step. Accordingly, the black silver image is formed within the exposed area. The heat developable light-sensitive material usually contains a synthetic polymer as a binder because gelatin, which is used as a binder of a conventional silver halide photographic material has a poor resistance to heat.

A heat development does not require processing solutions of a wet development. The heat development can easily and rapidly conducted, compared with the wet development. However, a wet development is still conducted in the technical field of photography. The heat development has unsolved problems, while the wet development does not have the problems.

A photographic material usually contains a dye, such as a filter dye, an antihalation dye or antiirradiation dye. The dye functions at the exposing step. If the dye remains in the photographic material after the exposing step, a formed image would be colored with the dye. Therefore, the dye should be removed from the photographic material at a developing step. At the wet development, the dye can easily be removed from the photographic material by using processing solutions. On the other hand, it is very difficult (substantially impossible) to remove the dye at the heat development.

A simple, easy and rapid development has been desired in the field of recent photography, especially in the field of recent clinical or printing photography. The improvement of the conventional wet development, however, has nearly reached its limits. A recent clinical or printing photographic material is imagewise exposed to near infrared laser (particularly electromagnetic wave having a wavelength of not less than 750 nm) or near infrared light emitting diode. If a near infrared light is used, a near infrared absorbing dye is incorporated into the photographic material to prevent halation or irradiation. The near infrared absorbing dye has small absorption in the visible region. Even if the near infrared absorbing dye remains in the heat developing process, influence of the dye on the image is relatively small.

For reasons mentioned above, much attention has been paid again to a heat development image forming process in the field of clinical or printing photography. The near infrared absorbing dyes used in the heat developable light-sensitive materials include cyanine dyes (described in Japanese Patent Provisional Publication No. 8(1996)-201959 and European Patent No. 714046), indolenine cyanine dyes (described in Japanese Patent Provisional Publication No. 4(1992)-182640 and U.S. Pat. No. 5,545,515) and dihydroperimidine squarylium dyes (described in U.S. Pat. No. 5,380,635). On the other hand, cyanine dyes (described in U.S. Pat. No. 5,330,884, European Patent No. 342576A, and Japanese Patent Provisional Publication Nos. 5(1993)-216171, 5(1993)-216167 and 6(1994)-43583) are usually used as the near infrared absorbing dyes in conventional silver halide photographic materials.

SUMMARY OF THE INVENTION

Near infrared absorbing dyes usually have the maximum absorption peak in a near infrared region. The dyes have relatively small absorption in a visible region. However, the absorption in the visible region is not negligible. The absorption is remarkable in the case that the absorption is concentrated on a specific wavelength in the visible region. A problem of coloring an image is caused by the concentration rather than the amount of absorption. If the near infrared absorbing dye has a second absorption peak in the visible region or if the absorption is concentrated on a specific wavelength in the visible region (though not forming a peak), the resulting image is markedly colored. In such a case, it is said that the near infrared absorption dye has a bad chromaticity. On the other hand, if the absorption is not concentrated on a specific wavelength, the dye has a good chromaticity and the resulting image is not remarkably colored even though the absorption in the whole visible region is relatively large.

The known near infrared absorbing dyes have the problem of bad chromaticity. For example, the indolenine cyanine dyes described in U.S. Pat. No. 5,545,515 have remarkable absorption in the range of 350 to 450 nm.

Further, most of the known near infrared absorbing dyes are fluorescent compounds. If silver halide is exposed to fluorescence emitted from the dye, the sharpness of the obtained image is degraded. A dye is usually used as an antihalation dye or an antiirradiation dye to improve the sharpness. If a fluorescent dye is used, the sharpness cannot be cannot be sufficiently improved. Gelatin used as a binder in a conventional silver halide photographic material has a function of absorbing fluorescence. Therefore, the degradation of the sharpness is not remarkable even if a fluorescent dye is used in the a conventional silver halide photographic material. On the other hand, the problem is serious in a heat developable light-sensitive materials, because a synthetic polymer is usually used in place of gelatin.

An object of the present invention is to provide an improved heat development image forming process, which can form an image of good chromaticity and high sharpness.

Another object of the invention is to provide a new heptamethine cyanine compound, which can advantageously be used in a heat development image forming process.

The present invention provides a heat development image forming process comprising steps of:

imagewise exposing to light a heat developable light-sensitive material comprising a support, a non-lightsensitive layer and a light-sensitive layer containing a silver halide and a reducing agent, wherein the non-light-sensitive layer or the light-sensitive layer contains a heptamethine cyanine dye represented by the formula (I):

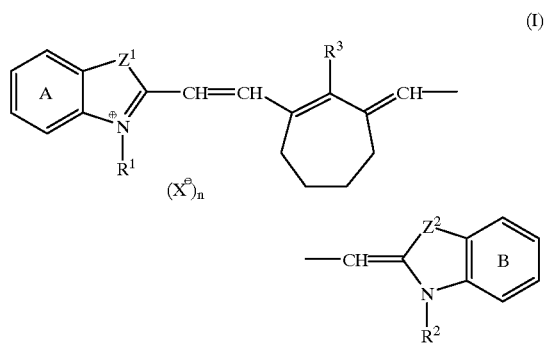

in which $Z^1$ is $-CR^{11}R^{12}-$, $-O-$, $-S-$ or $-NR^{13}-$; $Z^2$ is $-CR^{21}R^{22}-$, $-O-$, $-S-$ or $-NR^{23}-$; each of $R^1$ and $R^2$ independently is an alkyl group, a substituted alkyl group, an alkenyl group, a substituted alkenyl group, an aralkyl group or a substituted aralkyl group; $R^3$ is hydrogen, a halogen atom, an alkyl group, a substituted alkyl group, a cycloalkyl group, a substituted cycloalkyl group, an aryl group, a substituted aryl group, a heterocyclic group, a substituted heterocyclic group, cyano, $-SO_2R^{31}$, $-OR^{32}$, $-SR^{33}$ or $-NR^{34}R^{35}$; each of $R^{11}$, $R^{12}$, $R^{21}$ and $R^{22}$ independently is an alkyl group, or $R^{11}$ and $R^{12}$ or $R^{21}$ and $R^{22}$ are combined with each other to form a saturated aliphatic spiro ring; each of $R^{13}$ and $R^{23}$ independently is an alkyl group, a substituted alkyl group, an alkenyl group, a substituted alkenyl group, an aralkyl group or a substituted aralkyl group; each of $R^{31}$, $R^{32}$ and $R^{33}$ independently is an alkyl group, a substituted alkyl group, a cycloalkyl group, a substituted cycloalkyl group, an aralkyl group, a substituted aralkyl group, an aryl group, a substituted aryl group, a heterocyclic group or a substituted heterocyclic group; $R^{34}$ is hydrogen, an alkyl group, a substituted alkyl group, an aryl group or a substituted aryl group; $R^{35}$ is an alkyl group, a substituted alkyl group, an aryl group, a substituted aryl group, an alkylsulfonyl group, an arylsulfonyl group, a substituted arylsulfonyl group or an acyl group; each of the benzene rings A and B may be independently condensed with another benzene ring, and the benzene rings A and B and their condensed rings may further have a substituent group; X is an anion; and n is 0 or 1; and then heating the heat developable light-sensitive material to form a silver image.

The invention also provides a heptamethine cyanine compound represented by the formula (II):

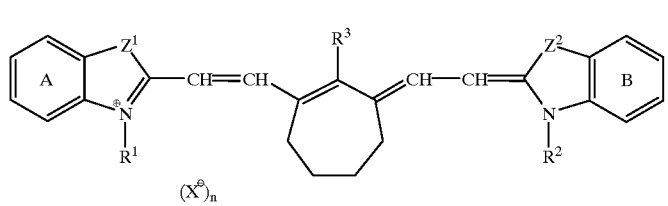

in which $Z^1$ is $-CR^{11}R^{12}-$, $-O-$, $-S-$ or $-NR^{13}-$; $Z^2$ is $-CR^{21}R^{22}-$, $-O-$, $-S-$ or $-NR^{23}-$; each of $R^1$ and $R^2$ independently is an alkyl group, a substituted alkyl group, an alkenyl group, a substituted alkenyl group, an aralkyl group or a substituted aralkyl group; $R^3$ is cyano, $-SO_2R^{31}$, $-OR^{32}$ or $-SR^{33}$; each of $R^{11}$, $R^{12}$, $R^{21}$ and $R^{22}$ independently is an alkyl group, or $R^{11}$ and $R^{12}$ or $R^{21}$ and $R^{22}$ are combined with each other to form a saturated aliphatic spiro ring; each of $R^{13}$ and $R^{23}$ independently is an alkyl group, a substituted alkyl group, an alkenyl group, a substituted alkenyl group, an aralkyl group or a substituted aralkyl group; each of $R^{31}$, $R^{32}$ and $R^{33}$ independently is an alkyl group, a substituted alkyl group, a cycloalkyl group, a substituted cycloalkyl group, an aralkyl group, a substituted aralkyl group, an aryl group, a substituted aryl group, a heterocyclic group or a substituted heterocyclic group; each of the benzene rings A and B may be independently condensed with another benzene ring, and the benzene rings A and B and their condensed rings may further have a substituent group; X is an anion; and n is 0 or 1.

DETAILED DESCRIPTION OF THE INVENTION

The heat development image forming process of the present invention is characterized by use of a heptamethine cyanine dye represented by the formula (I).

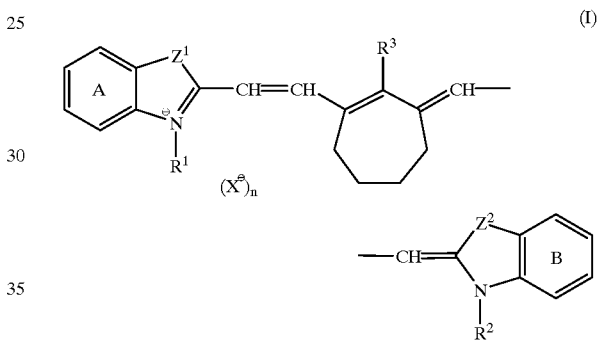

In the formula (I), $Z^1$ is $-CR^{11}R^{12}-$, $-O-$, $-S-$ or $-NR^{13}-$, and $Z^2$ is $-CR^{21}R^{22}-$, $-O-$, $-S-$ or $-NR^{23}-$. $Z^1$ preferably is $-CR^{11}R^{12}-$, $-O-$ or $-S-$, and more preferably is $-CR^{11}R^{12}-$. $Z^2$ preferably is $-CR^{21}R^{22}-$, $-O-$ or $-S-$, and more preferably is $-CR^{21}R^{22}-$. $Z^1$ and $Z^2$ preferably are the identical divalent linking groups.

Each of $R^{11}$ and $R^{12}$ independently is an alkyl group, or $R^{11}$ and $R^{12}$ are combined with each other to form a saturated aliphatic spiro ring. Each of $R^{21}$ and $R^{22}$ independently is an alkyl group, or $R^{21}$ and $R^{22}$ are combined with each other to form a saturated aliphatic spiro ring.

The term "alkyl group" used in the present specification means an unsubstituted chain alkyl group. A substituted alkyl group and a cycloalkyl group are separately defined below. The alkyl group may have a branched chain.

Examples of the alkyl groups include methyl, ethyl, propyl, butyl, isobutyl, pentyl and hexyl. The alkyl group preferably has 1 to 20 carbon atoms, more preferably has 1 to 10 carbon atoms, further preferably has 1 to 6 carbon atoms, furthermore preferably has 1 to 3 carbon atoms, and most preferably has 1 carbon atom (methyl). The saturated aliphatic spiro ring formed by $R^{11}$ and $R^{12}$ or by $R^{21}$ and $R^{22}$ preferably is a five-membered ring (cyclopentane ring), a six-membered ring (cyclohexane ring) or a seven-membered ring (cycloheptane ring). The six-membered ring is particularly preferred. $R^{11}$ and $R^{12}$ preferably are the identical alkyl groups, and $R^{21}$ and $R^{22}$ preferably are the identical alkyl groups.

Each of $R^{13}$ and $R^{23}$ independently is an alkyl group, a substituted alkyl group, an alkenyl group, a substituted alkenyl group, an aralkyl group or a substituted aralkyl group. Each of $R^{13}$ and $R^{23}$ preferably is an alkyl group, a substituted alkyl group, an alkenyl group or a substituted alkenyl group, and more preferably is an alkyl group or a substituted alkyl group. The definition and examples of the groups are the same as those described below about $R^1$ and $R^2$.

In the formula (I), each of $R^1$ and $R^2$ independently is an alkyl group, a substituted alkyl group, an alkenyl group, a substituted alkenyl group, an aralkyl group or a substituted aralkyl group. Each of $R^1$ and $R^2$ preferably is an alkyl group, a substituted alkyl group, an aralkyl group or a substituted aralkyl group, and more preferably is an alkyl group or a substituted alkyl group.

The alkyl group may have a branched structure. Examples of the alkyl groups include methyl, ethyl, propyl, butyl, isobutyl, pentyl and hexyl. The alkyl group preferably has 1 to 30 carbon atoms, more preferably has 1 to 20 carbon atoms, further preferably has 1 to 15 carbon atoms, and most preferably has 1 to 10 carbon atoms.

The alkyl moiety of the substituted alkyl group is the same as the above-mentioned alkyl group. Examples of the substituent groups include a halogen atom (e.g., fluorine, chlorine, bromine), an alkoxycarbonyl group (e.g., methoxycarbonyl, ethoxycarbonyl), an aryloxy group, an alkyl-substituted aryloxy group, hydroxyl, carboxyl and sulfo. The carboxyl and the sulfo can be in the form of a salt. A cation for forming the salt with the carboxyl or the sulfo preferably is an alkali metal ion (e.g., sodium ion, potassium ion).

The term "alkenyl group" used in the present specification means an unsubstituted chain alkenyl group. The alkenyl group may have a branched structure. Examples of the alkenyl groups include 1-pentenyl, vinyl, allyl, 1-butenyl and 1-propenyl. The alkenyl group preferably has 2 to 20 carbon atoms, more preferably has 2 to 15 carbon atoms, further preferably has 2 to 10 carbon atoms, and most preferably has 2 to 6 carbon atoms.

The alkenyl moiety of the substituted alkenyl group is the same as the above-mentioned alkenyl group. Examples of the substituent groups are the same as those of the substituted alkyl groups.

The term "aralkyl group" used in the present specification means an unsubstituted aralkyl group wherein the alkyl moiety has a chain structure. The alkyl moiety of the aralkyl group may have a branched structure. Examples of the aralkyl groups include benzyl, phenethyl and phenylpropyl. The aralkyl group preferably has 7 to 50 carbon atoms, more preferably has 7 to 40 carbon atoms, further preferably has 7 to 30 carbon atoms, and most preferably has 7 to 22 carbon atoms.

The aralkyl moiety of the substituted aralkyl group is the same as the above-mentioned aralkyl group. Examples of the substituent groups include an alkyl group (e.g., methyl, t-amyl), an alkoxy group and a halogen atom (e.g., fluorine, chlorine, bromine).

In the formula (I), $R^3$ is hydrogen, a halogen atom, an alkyl group, a substituted alkyl group, a cycloalkyl group, a substituted cycloalkyl group, an aryl group, a substituted aryl group, a heterocyclic group, a substituted heterocyclic group, cyano, $-SO_2R^{31}$, $-OR^{32}$, $-SR^{33}$ or $-NR^{34}R^{35}$. $R^3$ preferably is cyano, $-SO_2R^{31}$, $-OR^{32}$ or $-SR^{33}$, more preferably is $-SO_2R^{31}$, $-OR^{32}$ or $-SR^{33}$, further preferably is $-OR^{32}$ or $-SR^{33}$, and most preferably is $-SR^{33}$.

Examples of the halogen atoms include fluorine, chlorine and bromine.

The alkyl group may have a branched structure. Examples of the alkyl groups include methyl, ethyl, propyl, butyl, isobutyl, pentyl and hexyl. The alkyl group preferably has 1 to 20 carbon atoms, more preferably has 1 to 15 carbon atoms, further preferably has 1 to 10 carbon atoms, and most preferably has 1 to 6 carbon atoms.

The alkyl moiety of the substituted alkyl group is the same as the above-mentioned alkyl group. Examples of the substituent groups include a halogen atom (e.g., fluorine, chlorine, bromine), an alkoxycarbonyl group (e.g., methoxycarbonyl, ethoxycarbonyl) and hydroxyl.

Examples of the cycloalkyl groups include cyclopentyl and cyclohexyl. The cycloalkyl group preferably has 5 to 10 carbon atoms, more preferably has 5 to 7 carbon atoms, and most preferably has 6 carbon atoms (cyclohexyl).

The cycloalkyl moiety of the substituted cycloalkyl group is the same as the above-mentioned cycloalkyl group. Examples of the substituent groups include a halogen atom (e.g., fluorine, chlorine, bromine), an alkoxycarbonyl group (e.g., methoxycarbonyl, ethoxycarbonyl) and hydroxyl.

Examples of the aryl groups include phenyl and naphthyl. The aryl group preferably has 6 to 12 carbon atoms.

The aryl moiety of the substituted aryl group is the same as the above-mentioned aryl group. Examples of the substituent groups include an alkyl group (e.g., methyl, ethyl), an alkoxy group (e.g., methoxy, ethoxy), an aryloxy group (e.g., phenoxy), a halogen-substituted aryloxy group (e.g., p-chlorophenoxy), a halogen atom (e.g., fluorine, chlorine, bromine), an alkoxycarbonyl group (e.g., ethoxycarbonyl), cyano, nitro, carboxyl and sulfo. The carboxyl and the sulfo may be in the form of a salt. A cation for forming the salt with the carboxyl or the sulfo preferably is an alkali metal ion (e.g., sodium ion, potassium ion).

The heterocyclic ring of the heterocyclic group is preferably a five-membered ring or a six-membered ring. The heterocyclic ring may be condensed with another heterocyclic ring, an aromatic ring or an aliphatic ring. Examples of the hetero atoms of the heterocyclic ring include nitrogen, oxygen, sulfur, selenium and tellurium. Examples of the heterocyclic rings (and the condensed rings) include piperidine ring, piperazine ring, thiophene ring, furan ring, pyran ring, xanthene ring, pyrrole ring, imidazole ring, pyrazole ring, isooxazole ring, pyridine ring, pyrazine ring, indole ring, purine ring, quinoline ring, phthalazine ring, carbazole ring, perimidine ring, pyrrolidine ring, indoline ring, morpholine ring, thiazole ring, benzothiazole ring, benzoxazole ring, benzoselenazole ring, thiazoline ring, benzimidazole ring, tetrazole ring, triazole ring, pyrimidine ring, thiadiazole ring, pyrazolone ring, barbituric ring, pyridone ring, 4-butanelactam ring and 6-hexanelactam ring.

The heterocyclic moiety of the substituted heterocyclic group is the same as the above-mentioned heterocyclic group. Examples of the substituent groups include an alkyl group (e.g., methyl, ethyl), an alkoxy group (e.g., methoxy, ethoxy), an aryl group (e.g., phenyl), an aryloxy group (e.g., phenoxy), a halogen-substituted aryloxy group (e.g., p-chlorophenoxy), a halogen atom (e.g., fluorine, chlorine, bromine), an alkoxycarbonyl group (e.g., ethoxycarbonyl), cyano, nitro, carboxyl and sulfo. The carboxyl and the sulfo may be in the form of a salt. A cation for forming the salt with the carboxyl or the sulfo preferably is an alkali metal ion (e.g., sodium ion, potassium ion).

Each of $R^{31}$, $R^{32}$ and $R^{33}$ independently is an alkyl group, a substituted alkyl group, a cycloalkyl group, a substituted cycloalkyl group, an aralkyl group, a substituted aralkyl group, an aryl group, a substituted aryl group, a heterocyclic group or a substituted heterocyclic group. The definitions and examples of the alkyl group, the substituted alkyl group, the cycloalkyl group, the substituted cycloalkyl group, the aryl group, the substituted aryl group, the heterocyclic group and the substituted heterocyclic group are the same as those described about $R^3$.

The alkyl moiety of the aralkyl group may have a branched structure. Examples of the aralkyl groups include benzyl, phenethyl, and phenylpropyl. The aralkyl group preferably has 7 to 40 carbon atoms, more preferably has 7 to 30 carbon atoms, further preferably has 7 to 20 carbon atoms, and most preferably has 7 to 15 carbon atoms.

The aralkyl moiety of the substituted aralkyl group is the same as the above-mentioned aralkyl group. Examples of the substituent groups include an alkyl group (e.g., methyl, t-amyl), an alkoxy group and a halogen atom (e.g., fluorine, chlorine, bromine).

$R^{34}$ is hydrogen, an alkyl group, a substituted alkyl group, an aryl group or a substituted aryl group. $R^{35}$ is an alkyl group, a substituted alkyl group, an aryl group, a substituted aryl group, an alkylsulfonyl group, an arylsulfonyl group, a substituted arylsulfonyl group or an acyl group. The definitions and examples of the alkyl group, the substituted alkyl group, the aryl group and the substituted aryl group are the same as those described about $R^3$.

The alkyl moiety of the alkylsulfonyl group may have a branched structure. Examples of the alkylsulfonyl groups include mesyl. The alkylsulfonyl group preferably has 1 to 20 carbon atoms, more preferably has 1 to 10 carbon atoms, and most preferably has 1 to 6 carbon atoms.

Examples of the arylsulfonyl groups include benzenesulfonyl. The arylsulfonyl group preferably has 6 to 10 carbon atoms.

The arylsulfonyl moiety of the substituted arylsulfonyl group is the same as the above-mentioned arylsulfonyl group. Examples of the substituent groups include an alkyl group (e.g., methyl).

The acyl group preferably has 2 to 12 carbon atoms. Examples of the acyl groups include acetyl, propionyl and benzoyl.

In the formula (I), each of the benzene rings A and B may be condensed with another benzene ring. The benzene rings A and B and their condensed rings may further have a substituent group. Examples of the substituent groups include an alkyl group (e.g., methyl, ethyl), an alkoxy group (e.g., methoxy, ethoxy), an aryl group (e.g., phenyl), an aryloxy group (e.g., phenoxy), a halogen-substituted aryloxy group (e.g., p-chlorophenoxy), a halogen atom (e.g., fluorine, chlorine, bromine), an alkoxycarbonyl group (e.g., ethoxycarbonyl), cyano, nitro, carboxyl and sulfo. The carboxyl and the sulfo may be in the form of a salt. A cation for forming the salt with the carboxyl or the sulfo preferably is an alkali metal ion (e.g., sodium ion, potassium ion).

In the formula (I), X is an anion. The anion is preferably a monovalent anion. Examples of the anions include a halogen ion (e.g., Cl, Br, I), a p-toluenesulfonic acid ion, an ethylsulfuric acid ion, $PF_6$, $BF_4$ and $ClO_4$.

In the formula (I), n is 0 or 1. When the dye forms an intramolecular salt, n is 0.

A new heptamethine cyanine compound is represented by the formula (II):

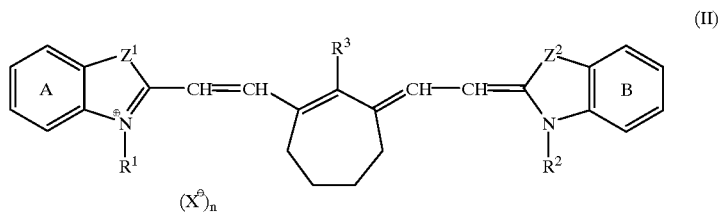

(II)

in which $Z^1$ is —$CR^{11}R^{12}$—, —O—, —S— or —$NR^{13}$—; $Z^2$ is —$CR^{21}R^{22}$—, —O—, —S— or —$NR^{23}$—; each of $R^1$ and $R^2$ independently is an alkyl group, a substituted alkyl group, an alkenyl group, a substituted alkenyl group, an aralkyl group or a substituted aralkyl group; $R^3$ is cyano, —$SO_2R^{31}$, —$OR^{32}$ or —$SR^{33}$; each of $R^{11}$, $R^{12}$, $R^{21}$ and $R^{22}$ independently is an alkyl group, or $R^{11}$ and $R^{12}$ or $R^{21}$ and $R^{22}$ are combined with each other to form a saturated aliphatic spiro ring; each of $R^{13}$ and $R^{23}$ independently is an alkyl group, a substituted alkyl group, an alkenyl group, a substituted alkenyl group, an aralkyl group or a substituted aralkyl group; each of $R^{31}$, $R^{32}$ and $R^{33}$ independently is an alkyl group, a substituted alkyl group, a cycloalkyl group, a substituted cycloalkyl group, an aralkyl group, a substituted aralkyl group, an aryl group, a substituted aryl group, a heterocyclic group or a substituted heterocyclic group; each of the benzene rings A and B may be independently condensed with another benzene ring, and the benzene rings A and B and their condensed rings may further have a substituent group; X is an anion; and n is 0 or 1.

The formula (II) has the same meanings as those of the formula (I), except for $R^3$ (cyano, —$SO_2R^{31}$, —$OR^{32}$ or —$SR^{33}$)

Examples of the heptamethine cyanine dyes represented by the formula (I) are shown below.

(1)–(5)
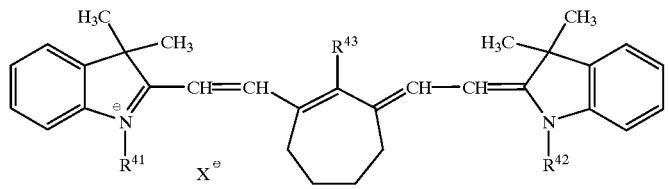
(1)
R⁴¹, R⁴²: —C₂H₅ R⁴³: —S—C₆H₅ X: BF₄
(2)
R⁴¹, R⁴²: —CH₃ R⁴³: —S—C₆H₅ X: ClO₄
(3)
R⁴¹, R⁴²: —(CH₂)₃—C₆H₃(t-C₅H₁₁)₂ R⁴³: —S—C₆H₅ X: ClO₄
(4)
R⁴¹, R⁴²: —CH₃ R⁴³: —O—C₆H₅ X: ClO₄
(5)
R⁴¹, R⁴²: —CH₃ R⁴³: —S—C₆H₄(2-CO₂H) X: ClO₄
(6)–(11)
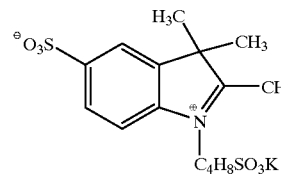
(6)
R⁵³: —SCH₂CO₂H
(7)
R⁵³: —S—C₆H₅
(8)
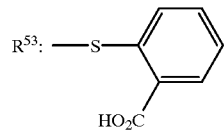
(9)
R⁵³: —S—C₆H₄—CH₂OOCCH₃
(10)
R⁵³: —S—(2-pyrimidinyl)
(11)
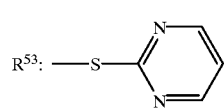

-continued
(12)–(15)
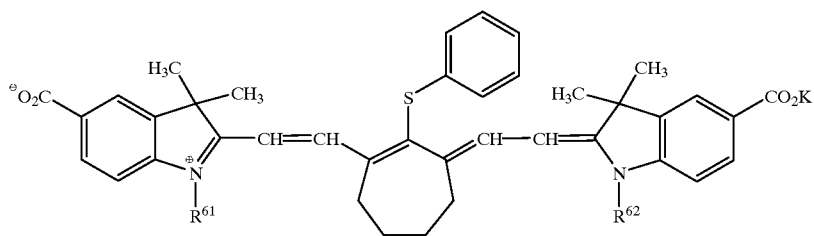
(12)
R⁶¹, R⁶²: —CH₃
(13)
R⁶¹, R⁶²: —C₂H₄SO₃K
(14)
R⁶¹, R⁶²: —C₂H₄CO₂K
(15)
R⁶¹, R⁶²: —C₂H₈SO₃K
(16)–(18)
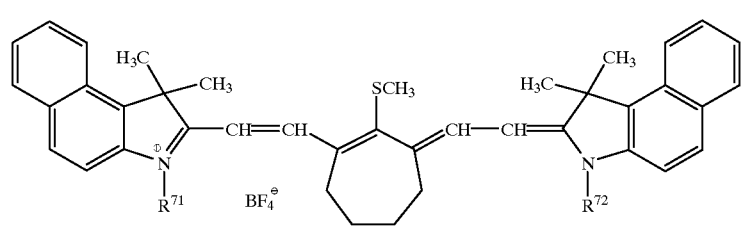
(16)
R⁷¹, R⁷²: —CH₃
(17)
R⁷¹, R⁷²: —C₄H₉
(18)
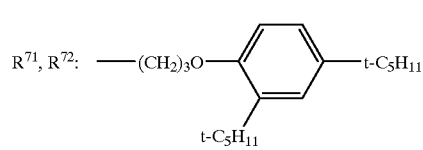
(19)–(28)
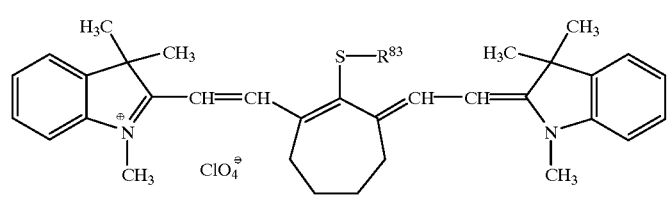
(19)
R⁸³: —C₅H₁₁
(20)
R⁸³: —CH₃
(21)
R⁸³: —t-C₄H₉
(22)
R⁸³: 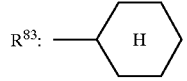
(23)
R⁸³: 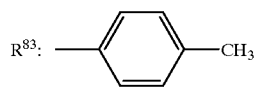
(24)
R⁸³: (pyrimidine structure)
(25)
R⁸³: (benzoxazole structure)
(26)
R⁸³: 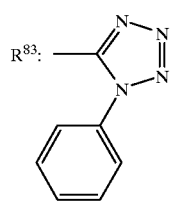

-continued

(27) R⁸³: [4-methyl-1,2,4-triazol-3-yl]

(28) R⁸³: [5-amino-4H-1,2,4-triazol-3-yl]

(29)–(32)

[cyanine dye structure with indolenine groups, cycloheptene bridge bearing S—R⁹³, counterion ClO₄⁻, N-substituents R⁹¹, R⁹²]

(29) R⁹¹, R⁹²: —CH₂—CH=CH₂    R⁹³: —C₆H₄—OH (4-hydroxyphenyl)

(30) R⁹¹, R⁹²: —CH₂—C₆H₅    R⁹³: —CH₂—C₆H₅

(31) R⁹¹, R⁹²: —(CH₂)₃O—C₆H₃(t-C₅H₁₁)₂    R⁹³: —CH₃

(32) R⁹¹, R⁹²: —C₆H₁₃    R⁹³: —CH₃

(33)–(35)

[cyanine dye structure with N-methyl indolenines, cycloheptene bridge bearing R¹⁰³, counterion BF₄⁻]

(33) R¹⁰³: —CN

(34) R¹⁰³: —SO₂CH₃

(35) R¹⁰³: —SCH₂CO₂H (36)–(41)

[cyanine dye structure with substituted indolenines (R¹¹⁴, R¹¹⁵ on rings; R¹¹¹, R¹¹² on N), cycloheptene bridge bearing R¹¹³, counterion X⁻]

(36) R¹¹¹, R¹¹²: —CH₃    R¹¹³: —Cl    R¹¹⁴, R¹¹⁵: —H    X: ClO₄

(37) R¹¹¹, R¹¹²: —CH₃    R¹¹³: —Cl    R¹¹⁴, R¹¹⁵: —Cl    X: ClO₄

(38) R¹¹¹, R¹¹²: —CH₃    R¹¹³: —Cl    R¹¹⁴, R¹¹⁵: —CH₃    X: ClO₄

(39) R¹¹¹, R¹¹²: —CH₃    R¹¹³: —Cl    R¹¹⁴, R¹¹⁵: —OCH₃    X: ClO₄

-continued
(40)
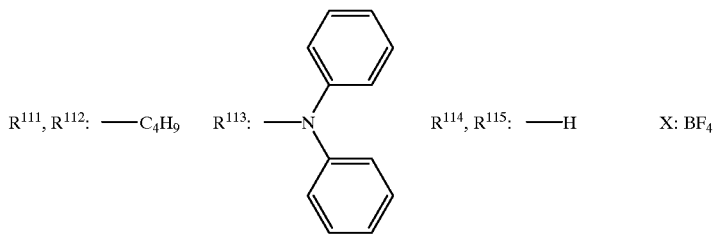
R¹¹¹, R¹¹²: —C₄H₉   R¹¹³: —N(C₆H₅)₂   R¹¹⁴, R¹¹⁵: —H   X: BF₄
(41)
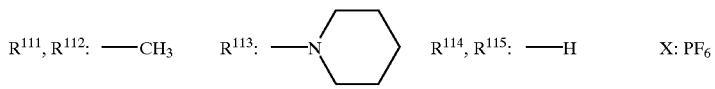
R¹¹¹, R¹¹²: —CH₃   R¹¹³: —N(piperidine)   R¹¹⁴, R¹¹⁵: —H   X: PF₆
(42)–(45)
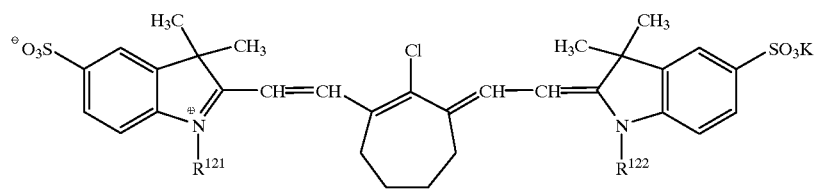
| | |
|---|---|
| (42) R¹²¹, R¹²²: —CH₃ | (43) R¹²¹, R¹²²: —C₂H₄SO₃K |
| (44) R¹²¹, R¹²²: —C₃H₆SO₃K | (45) R¹²¹, R¹²²: —C₄H₈SO₃K |
(46)–(49)
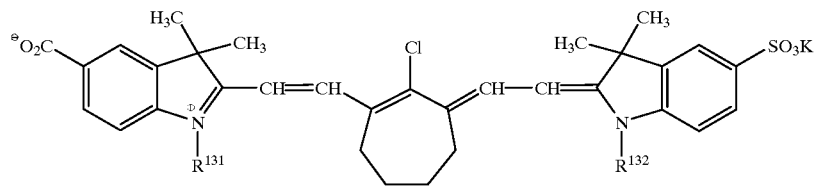
| | |
|---|---|
| (46) R¹³¹, R¹³²: —CH₃ | (47) R¹³¹, R¹³²: —C₂H₄SO₃K |
| (48) R¹³¹, R¹³²: —C₂H₄CO₂K | (49) R¹³¹, R¹³²: —C₄H₈SO₃K |
(50)–(52)
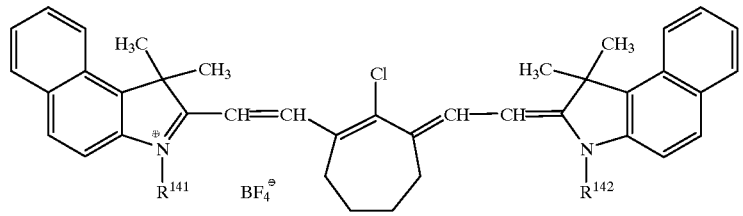
(51) R¹⁴¹, R¹⁴²: —CH₃   R¹⁴¹, R¹⁴²: —C₄H₉
(52)
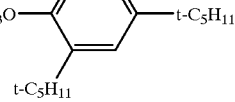
R¹⁴¹, R¹⁴²: —(CH₂)₃—O—C₆H₃(t-C₅H₁₁)₂

-continued
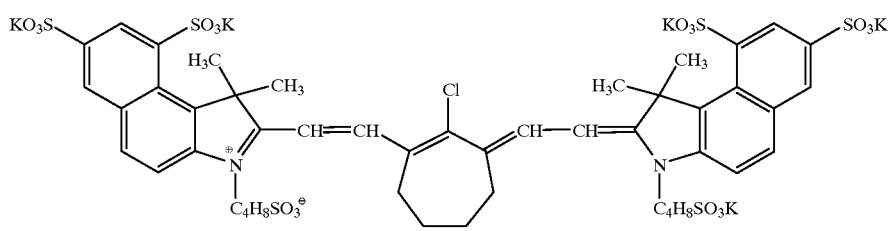
(53)
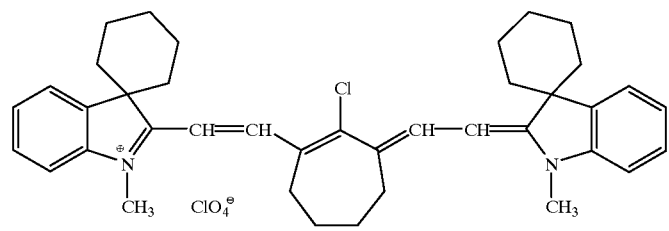
(54)
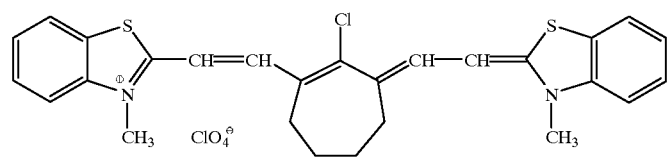
(55)
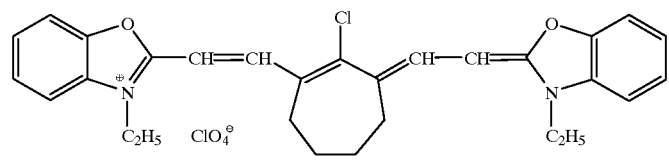
(56)
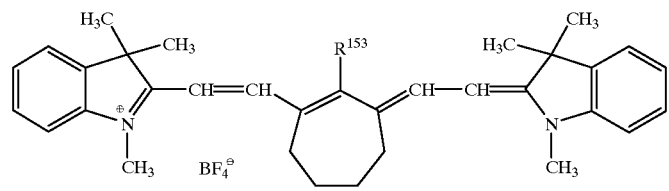
(57)–(60)
(57)     (58)
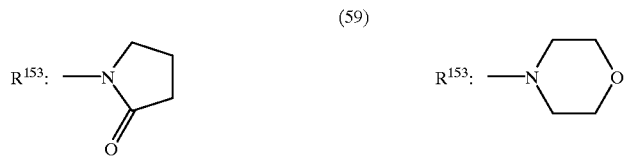
(59)     (60)

-continued (61)

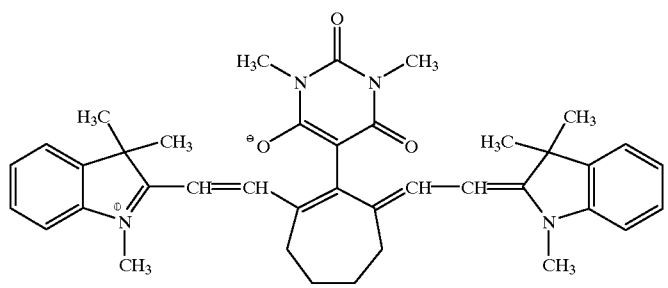

(62)–(64)

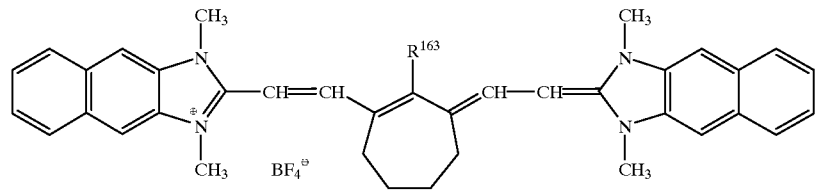

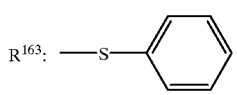  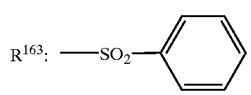

(62)

$R^{163}$: —Cl

Synthesis Example 1
Synthesis of Intermediate A

To a solution of 27 g of N-methylformanilide in 25 ml of chloroform, 28 ml of phosphorus oxychloride was added at a temperature of not higher than 10° C. After the mixture was stirred at room temperature for 1 hour, 6.72 g of cycloheptanone was added, followed by stirring at 50° C. for 4 hours. Then, the temperature of the mixture was returned to room temperature. To the mixture was then added an aqueous solution containing 20 g of potassium carbonate and was further added a mixture of 16.8 g of aniline, 15 ml of concentrated hydrochloric acid and 100 ml of water. The resulting mixture was stirred at room temperature for 1 hours. Then, 100 ml of dichloromethane was added. The crystals precipitated were filtered to obtain 11 g of the following intermediate A.

(Intermediate A)

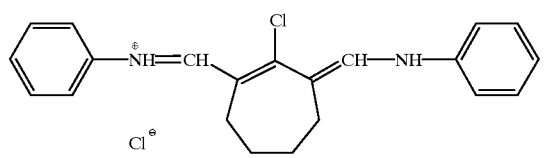

Synthesis of Dye (36)

A mixture of 2.8 g of 1,2,3,3-tetramethylindolenium bromide, 1.86 g of the intermediate A, 20 ml of isopropyl alcohol, 1.4 ml of acetic anhydride and 4.2 ml of triethylamine was stirred at 50° C. for 1 hour, and to the mixture was added 80 ml of water. The crystals precipitated were filtered. The crystals were dissolved in 100 ml of methyl alcohol, and to the solution was added 1.2 ml of a 70 wt. % aqueous solution of perchloric acid. The crystals precipitated were filtered to obtain a dye (36). The yield was 0.8 g, λmax was 778.3 nm (acetone), and ε was $1.7 \times 10^5$.

Synthesis Example 2
Synthesis of Dye (2)

To a mixture of 6 g of the dye (36), 30 ml of methyl alcohol and 2.8 ml of triethylamine, 1.1 g of thiophenol was added, and the resulting mixture was stirred at room temperature for 2 hours. Then, 2 ml of perchloric acid was added. The crystals precipitated were filtered to obtain a dye (2). The yield was 3 g, λmax was 784.8 nm (acetone), and ε was $1.86 \times 10^5$.

Synthesis Example 3
Synthesis of Dye (19)

To a mixture of 6 g of the dye (36), 30 ml of methyl alcohol and 2.8 ml of triethylamine, 1.0 g of n-amylmercaptan was added, and the resulting mixture was stirred at 80° C. for 2 hours. Then, 2 ml of perchloric acid was added, and the resulting mixture was concentrated. The concentrate was subjected to chloroform-silica gel column chromatography to isolate a dye (19). The yield was 2.3 g, λmax was 775.5 nm (acetone), and ε was $1.75 \times 10^5$.

Other dyes were synthesized in a manner similar to the manner described above. The values of the absorption maximum (λmax) of the synthesized dyes are set forth in Table 1. The value of the dye (5) is measured in methanol, and the values of the dyes (8) and (45) are measured in water.

TABLE 1

| Dye | (36) | (37) | (38) | (39) | (2) |
|---|---|---|---|---|---|
| λmax (nm) | 778 | 794 | 791 | 793 | 785 |
| Dye | (3) | (19) | (20) | (31) | (24) |
| λmax (nm) | 793 | 776 | 771 | 777 | 791 |
| Dye | (25) | (61) | (5) | (8) | (45) |
| λmax (nm) | 795 | 773 | 779 | 786 | 781 |

The dye is preferably used as an antihalation dye or an antiirradiation dye in a heat developable light-sensitive material. The dye can also be used as a filtering dye for a near infrared light. When the dye is used as the antihalation dye or the filtering dye, the dye is generally added to the non-light-sensitive layer. When the dye is used as the antiirradiation dye, the dye is generally added to the light-sensitive layer.

The dye is incorporated into the heat developable light-sensitive material by adding a solution of the dye or a dispersion of the dye (solid grain dispersion) to a coating solution for forming the non-light-sensitive layer or the light-sensitive layer.

The amount (coating weight) of the dye is preferably in the range of 0.1 to 1,000 mg/m², and more preferably in the range of 1 to 200 mg/m².

The heat developable light-sensitive material is preferably a monosheet type, which means that an image can directly be formed on a heat developable light-sensitive material without using another sheet such as an image-receiving material. The present invention is particularly effective for the case of using a heat developable light-sensitive material for near infrared exposure.

The heat developable light-sensitive material has a light-sensitive layer containing silver halide (an catalytically active amount of photo catalyst) and a reducing agent. The light-sensitive layer preferably further contains a binder (usually a synthetic polymer), an organic silver salt (reducible silver source), a hydrazine compound (ultra-hard gradation agent) and a color toning agent (controlling color tone of silver). Plural light-sensitive layers may be provided. For example, a high sensitive layer and a low sensitive layer can be provided in the heat developable light-sensitive material to control gradation. The high-sensitive layer and the low sensitive layer may be arranged in any order, and for example, the low sensitive layer may be arranged on the lower side (support side), or the high sensitive layer may be arranged on the lower side.

The heat developable light-sensitive material further has a non-light-sensitive layer. The non-light-sensitive layer functions as a surface protective layer, an undercoating layer, a filter layer or an antihalation layer. The surface protective layer is provided on the light-sensitive layer. The undercoating layer and the antihalation layer are provided between the light-sensitive layer and the support. The filter layer can be provided on the surface of the same side as the light-sensitive layer or the surface of the opposite side of the light-sensitive layer. In addition to or in place of the heptamethine cyanine dye, other dyes or pigments may be used in the filter layer and the antihalation layer.

Examples of the support of the heat developable light-sensitive material include a paper, a paper coated with polyethylene, a paper coated with polypropylene, a parchment, a cloth, a sheet or a thin film of metal (e.g., aluminum, copper, magnesium, zinc), a glass board, a glass board coated with metal (e.g., chromium alloy, steel, silver, gold, platinum) and a plastic film. Examples of the plastics used for the support include polyalkyl methacrylate (e.g., polymethyl methacrylate), polyester (e.g., polyethylene terephthalate), polyvinyl acetal, polyamide (e.g., nylon) and cellulose ester (e.g., cellulose nitrate, cellulose acetate, cellulose acetate propionate, cellulose acetate butyrate).

The support may be coated with a polymer. Examples of the polymers include polyvinylidene chloride, an acrylic acid polymer (e.g., polyacrylonitrile, methyl acrylate), a polymer of an unsaturated dicarboxylic acid (e.g., itaconic acid, acrylic acid), carboxymethyl cellulose and polyacrylamide. A copolymer is also employable. In place of coating the support with a polymer, the support may be provided with an undercoating layer containing a polymer.

Silver bromide, silver iodide, silver chloride, silver chlorobromide, silver iodobromide or silver chloroiodobromide can be used as silver halide. Silver halide preferably contains silver iodide.

The silver halide is used in an amount of preferably 0.03 to 0.6 g/m², more preferably 0.05 to 0.4 g/m², and most preferably 0.1 to 0.4 g/m².

The silver halide is generally prepared in the form of a silver halide emulsion by a reaction of silver nitrate with a soluble halogen salt. The silver halide may be prepared by causing silver soap to react with a halogen ion and thereby subject the soap moiety of the silver soap to halogen conversion. A halogen ion may be added during the formation of the silver soap.

As the reducing agent, phenidone, hydroquinone, catechol or hindered phenol is preferable. The reducing agent is described in U.S. Pat. Nos. 3,770,448, 3,773,512, 3,593,863, 4,460,681, and Research Disclosure Nos. 17029 and 29963.

Examples of the reducing agents include aminohydroxycycloalkenone compounds (e.g., 2-hydroxy-piperidine-2-cyclohexenone), N-hydroxyurea derivatives (e.g., N-p-methylphenyl-N-hydroxyurea), hydrazones of aldehyde or ketone (e.g., anthracenealdehyde phenylhydrazone), phosphamide phenols, phosphamide anilines, polyhydroxybenzenes (e.g., hydroquinone, t-butyl-hydroqlinone, isopropyl-hydroquinone, 2,5-dihydroxy-phenylmethylsulfone), sulfohydroxamic acids (e.g., benzenesulfohydroxamic acid), sulfonamideanilines (e.g., 4-(N-methanesulfonamide) aniline), 2-tetrazolylthiohydroquinones (e.g., 2-methyl-5-(1-phenyl-5-tetrazolylthio)hydroquinone), tetrahydroquinoxalines (e.g., 1,2,3,4-tetrahydroquninoxaline), amidoximes, combinations of azines (e.g., aliphatic carboxylic acid arylhydrazides) and ascorbic acid, combination of polyhydroxybenzene and hydroxyamine, reductone, hydrazine, hydroxamic acids, combinations of azines and sulfonamidephenols, α-cyanophenyl-acetic acid derivative, combination of bis-β-naphthol and 1,3-dihydroxybenzene derivative, 5-pyrazolones, sulfonamidephenols, 2-phenylindane-1,3-dione, chroman, 1,4-dihydropyridines (e.g., 2,6-dimethoxy-3,5-dicarboethoxy-1,4-dihydropyridine), bisphenols (e.g., bis(2-hydroxy-3-t-butyl-5-methylphenyl)methane, bis(6-(hydroxy-m-tri)mesitol, 2,2-bis(4-hydroxy-3-methylphenyl)propane, 4,4-ethylidene-bis(2-t-butyl-6-methyl)phenol), ultraviolet-sensitive ascorbic acid derivative and 3-pyrazolidone.

An ester of aminoreductone which functions as a precursor of a reducing agent, e.g., piperidinohexose reductone monoacetate, can be used as the reducing agent.

A particularly preferred reducing agent is hindered phenol represented by the formula (A):

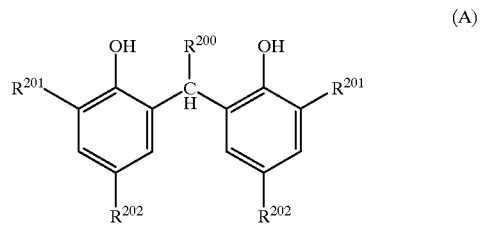

(A)

wherein $R^{200}$ is hydrogen or an alkyl group having 1 to 10 carbon atoms (e.g., butyl, 2,4,4-trimethylpentyl), and $R^{201}$ and $R^{202}$ are each independently an alkyl group having 1 to 5 carbon atoms (e.g., methyl, ethyl, t-butyl).

The light-sensitive layer and the non-light-sensitive layer preferably contain a binder. As the binder, a colorless, transparent or translucent polymer is generally employed. A natural polymer or a semisynthetic polymer (e.g., gelatin, gum arabic, hydroxyethyl cellulose, cellulose ester, casein, starch) is employable, but a synthetic polymer is preferable to the natural or semisynthetic polymer in consideration of heat resistance. Though the cellulose ester (e.g., acetate, cellulose acetate butyrate) is a semisynthetic polymer, it is preferably used as a binder of the heat developable light-sensitive material because it is relatively resistant to heat.

Examples of the synthetic polymers include polyvinyl alcohol, polyvinyl pyrrolidone, polyacrylic acid, polymethyl methacrylate, polyvinyl chloride, polymethacrylic acid, styrene/maleic anhydride copolymer, styrene/acrylonitrile copolymer, styrene/butadiene copolymer, polyvinyl acetal (e.g., polyvinyl formal, polyvinyl butyral), polyester, polyurethane, phenoxy resin, polyvinylidene chloride, polyepoxide, polycarbonate, polyvinyl acetate and polyamide. A hydrophobic polymer is preferable to a hydrophilic polymer. Of these, therefore, preferable are styrene/acrylonitrile copolymer, styrene/butadiene copolymer, polyvinyl acetal, polyester, polyurethane, cellulose acetate butyrate, polyacrylic acid, polymethyl methacrylate, polyvinyl chloride and polyurethane. More preferable are styrene/butadiene copolymer and polyvinyl acetal.

The binder is used by dissolving or emulsifying it in a solvent (water or organic solvent) of a coating solution for forming the light-sensitive layer or the non-light-sensitive layer. When the binder is emulsified in the coating solution, an emulsion of the binder may be mixed with the coating solution.

The amount of the binder in the layer containing the dye is preferably adjusted so that the coating weight of the dye becomes 0.1 to 60 wt. % of the binder. The coating weight of the dye is more preferably 0.2 to 30 wt. % of the binder, most preferably 0.5 to 10 wt. % of the binder.

The light-sensitive layer or the non-light-sensitive layer preferably further contains an organic silver salt. An organic acid for forming the silver salt is preferably a long-chain fatty acid. The fatty acid preferably has 10 to 30 carbon atoms, and more preferably has 15 to 25 carbon atoms. A complex of the organic silver salt is also available. The ligand of the complex preferably has a total stability constant against the silver ion in the range of 4.0 to 10.0. The organic silver salt is described in Research Disclosure Nos. 17029 and 29963.

Examples of the organic silver salts include a silver salt of a fatty acid (e.g., gallic acid, oxalic acid, behenic acid, stearic acid, palmitic acid, lauric acid), a silver salt of carboxyalkylthiourea (e.g., 1-(3-carboxypropyl)thiourea, 1-(3-carboxypropyl)-3,3-dimethylthiourea), a silver complex of a polymer reaction product of aldehyde (e.g., formaldehyde, acetaldehyde, butylaldehyde) and a hydroxy-substituted aromatic carboxylic acid, a silver salt of an aromatic carboxylic acid (e.g., salicylic acid, benzoic acid, 3,5-dihydroxybenzoic acid, 5,5-thiodisalicyclic acid), a silver salt or a silver complex of thioene (e.g., 3-(2-carboxyethyl)-4-hydroxymethyl-4-thiazoline-2-thioene, 3-carboxymethyl-4-thiazoline-2-thioene), a silver salt or a silver complex of nitrogen acid (e.g., imidazole, pyrazole, urazole, 1,2,4-thiazole, 1H-tetrazole, 3-amino-5-benzylthio-1,2,4-triazole, benzotriazole), a silver salt of saccharin, a silver salt of 5-chlorosalicylaldoxime, and a silver salt of mercaptide. Most preferable is the silver behenate. The organic acid silver salt is used in an amount of preferably not more than 3 g/m$^2$, more preferably not more than 2 g/m$^2$, in terms of silver.

The light-sensitive layer or the non-light-sensitive layer preferably further contains an ultra-hard gradation agent. When the heat developable light-sensitive material is used in the field of printing photography, reproduction of continuous gradation dot image or line image is important. By the use of the ultra-hard gradation agent, the reproducibility of the dot image or the line image can be improved. As the ultra-hard gradation agent, a hydrazine compound, a quaternary ammonium compound or an acrylonitrile compound (described in U.S. Pat. No. 5,545,515) is employed. The hydrazine compound is particularly preferable as the ultra-hard gradation agent.

The hydrazine compound includes hydrazine ($H_2N-NH_2$) and a compound wherein at least one hydrogen of said hydrazine is substituted. As for the substituent group, its aliphatic group, aromatic group or heterocyclic group is directly attached to the nitrogen atom of the hydrazine, or its aliphatic group, aromatic group or heterocyclic group is attached to the hydrazine through a connecting group. Examples of the connecting groups include —CO—, —CS—, —SO$_2$—, —POR— (R is an aliphatic group, an aromatic group or a heterocyclic group), —CNH— and combinations thereof.

The hydrazine compound is described in U.S. Pat. Nos. 5,464,738, 5,496,695, 5,512,411, 5,536,622, Japanese Patent Publication Nos. 6(1994)-77138, 6(1994)-93082, and Japanese Patent Provisional Publication Nos. 6(1994)-230497, 6(1994)-289520, 6(1994)-313951, 7(1995)-5610, 7(1995)-77783 and 7(1995)-104426.

The hydrazine compound can be added to a coating solution for forming the light-sensitive layer by dissolving it in an appropriate organic solvent. Examples of the organic solvents include alcohol (e.g., methanol, ethanol, propanol, fluorinated alcohol), ketone (e.g., acetone, methyl ethyl ketone), dimethylformamide, dimethyl sulfoxide and methyl cellosolve. A solution obtained by dissolving the hydrazine compound in an oily (co)solvent may be emulsified in the coating solution. Examples of the oily (co)solvents include dibutyl phthalate, tricresyl phosphate, glycerol triacetate, diethyl phthalate, ethyl acetate and cyclohexanone. A solid dispersion of the hydrazine compound may be added to the coating solution. The hydrazine compound can be dispersed using a known dispersing machine such as a ball mill, a colloid mill, a Mantongoring, a microfluidizer or an ultrasonic dispersing machine.

The ultra-hard gradation agent is used in an amount of preferably $1 \times 10^{-6}$ to $1 \times 10^{-2}$ mol, more preferably $1 \times 10^{-5}$ to $5 \times 10^{-3}$ mol, most preferably $2 \times 10^{-5}$ to $5 \times 10^{-3}$ mol, based on 1 mol of the silver halide.

In addition to the ultra-hard gradation agent, a hard gradation accelerator may be used. Examples of the hard gradation accelerators include an amine compound (described in U.S. Pat. No. 5,545,505), a hydroxamic acid (described in U.S. Pat. No. 5,545,507), acrylonitriles (described in U.S. Pat. No. 5,545,507) and a hydrazine compound (described in U.S. Pat. No. 5,558,983).

The light-sensitive layer or the non-light-sensitive layer preferably further contains a color toning agent. The color toning agent is described in Research Disclosure No. 17029.

Examples of the color toning agents include imides, (e.g., phthalimide), cyclic imides (e.g., succinimide), pyrazoline-5-ones (e.g., 3-phenyl-2-pyrazoline-5-one, 1-phenylurazole), quinazolinones (e.g., quinazoline, 2,4-thiazolidinedione), naphthalimides (e.g., N-hydroxy-1,8-naphthalimide), cobalt complex (e.g., hexamine cobalt trifluoroacetate), mercaptans (e.g., 3-mercapto-1,2,4-triazole), N-(aminomethyl)aryldicarboxyimides (e.g., N-(dimethylaminomethyl)phthalimide), blocked pyrazoles (e.g., N,N'-hexamethylene-1-carbamoyl-3,5- dimethylpyrazole), combination of isothiuronium derivative (e.g., 1,8-(3,6-dioxaoctane)bis(isothiuronium trifluoroacetate) and a photo bleaching agent (e.g., 2-(tribromomethylsulfonyl)benzothiazole), merocyanine dye (e.g., 3-ethyl-5-((3-ethyl-2-benzothiazolinylidene)-1-methylethylidene)-2-thio-2,4-oxazolidinedione), a phthalazinone compound and a metallic salt thereof (e.g., phthalazinone, 4-(1-naphthyl)phthalazinone, 6-chlorophthalazinone, 5,7-dimethyloxyphthalazinone, 2,3-dihydro-1,4-phthalazinone, 8-methylphthalazinone), combination of a phthalazinone compound and sulfinic acid derivative (e.g., sodium benzenesulfinate), combination of a phthalazinone compound and sulfonic acid derivative (e.g., sodium p-toluenesulfonate), combination of phthalazine and phthalic acid, combination of phthalazine or phthalazine adduct and dicarboxylic acid (preferably o-phenylene acid) or anhydride thereof (e.g., maleic anhydride, phthalic acid, 2,3-naphthalenedicarboxylic acid, phthalic anhydride, 4-methylphthalic acid, 4-nitrophthalic acid, tetrachlorophthalic anhydride), quinazolinediones, benzoxazine, naphthoxazine derivative, benzoxazine-2,4-diones (e.g., 1,3-benzoxazine-2,4-dione), pyrimidines, asymmetric triazines (e.g., 2,4-dihydroxypyrimidine), tetrazapentalene derivative (e.g., 3,6-dimercapto-1,4-diphenyl-1H,4H-2,3a,5,6a-tetrazapentalene), and phthalazine. Phthalazine is particularly preferred.

The light-sensitive layer or the non-light-sensitive layer (preferably non-light-sensitive layer) can contain an antifogging agent. A mercury-free antifogging agent (described in U.S. Pat. Nos. 3,874,946, 4, 546,075, 4,452,885, 4,756,999, 5,028,523, British Patent Nos. 92221383.4, 9300147.7, 9311790.1, Japanese Patent Provisional Publication No. 59(1984)-57234) is preferred to a mercury antifogging agent (described in U.S. Pat. No. 3,589,903).

A heterocyclic compound having a methyl group substituted with halogen (F, Cl, Br or I) is preferably used as the antifogging agent. Preferred examples of the antifogging agents are shown below.

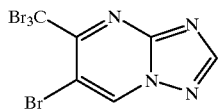

(115)

In the use of the silver halide, the silver halide is generally subjected to spectral sensitization. In the present invention, the silver halide is preferably spectrally sensitized in the near infrared region. The spectral sensitizing dye is described in Japanese Patent Provisional Publication Nos. 60(1985)-140336, 63(1988)-159841, 63(1988)-231437, 63(1988)-259651, 63(1988)-304242, 63(1988)-15245, and U.S. Pat. Nos. 4,639,414, 4,740455, 4,741,966, 4,751,175 and 4,835,096.

Into the heat developable light-sensitive material, various additives such as a surface active agent, an antioxidant, a stabilizer, a plasticizer, an ultraviolet light absorber and a coating aid may be incorporated. The additives are added to either the light-sensitive layer or the non-light-sensitive layer.

The heat developable light-sensitive material is preferably imagewise exposed to a near infrared light. The present invention is particularly effective for the exposure to the near infrared light (particularly near infrared laser). The wavelength of the near infrared light is in the range of preferably 700 to 1,100 nm, more preferably 750 to 860 nm, most preferably 780 to 830 nm. Examples of the near infrared light sources employable in the invention include a xenon flash lamp, various laser sources and light emitting diode.

After the imagewise exposure, the heat developable light-sensitive material is heated to perform development. Through the heat development, a black silver image is formed. The heating temperature is in the range of preferably 80 to 250° C., more preferably 100 to 200° C. The heating time is in the range of usually 1 second to 2 minutes.

EXAMPLE 1

Preparation of Light-sensitive Emulsion A

Solutions (1) to (7) were prepared in the following manner.

The solution (1) was prepared by mixing 131 g of stearic acid and 635 g of behenic acid with 13 liters of distilled water at 85° C. for 15 minutes.

The solution (2) was prepared by dissolving 89 g of sodium hydroxide in 1,500 ml of distilled water.

The solution (3) was prepared by mixing 19 ml of concentrated centrated nitric acid with 50 ml of distilled water.

The solution (4) was prepared by dissolving 365 g of silver nitrate in 2,500 ml of distilled water.

The solution (5) was prepared by dissolving 86 g of polyvinyl butyral in 4,300 ml of ethyl acetate.

The solution (6) was prepared by dissolving 290 g of polyvinyl butyral in 3,580 ml of isopropanol.

The solution (7) was prepared by dissolving 17 g of N-bromosuccinimide in 690 ml of acetone.

To the solution (1) kept at 85° C., the solution (2) was added over a period of 5 minutes with vigorous stirring. Then, the solution (3) was further added over a period of 25 minutes. The mixture was stirred for 20 minutes and cooled to 35° C. With vigorous stirring at 35° C., to the mixture was added the solution (4) over a period of 5 minutes, followed by stirring for 90 minutes. Then, the solution (5) was added, stirring was stopped, and the mixture was allowed to stand. The aqueous phase containing a salt was drawn out to obtain an oil phase. The oil phase was desolvated, and from the resulting liquid, trace amounts of water was drawn out. Then, the solution (6) was added, and the mixture was vigorously stirred at 50° C. Then, the solution (7) was further added over a period of 20 minutes, and the mixture was vigorously stirred for 105 minutes to obtain an emulsion A.

Formation of Layers

On a polyethylene terephthalate support having been colored blue with the following dye A, the following layers were formed one after another. Drying of each layer was carried out at 75° C. for 5 minutes.

(Dye A)

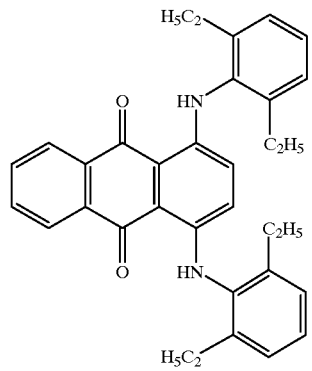

| Back side antihalation layer (thickness on wet basis: 80 μm) | |
|---|---|
| Mixture of polyvinyl butyral (10 wt. % isopropanol solution) and cellulose acetate butyrate (10% wt. % isopropanol solution (mixing ratio = 1:1) | 150 ml |
| Dye (solvent: acetone) | 50 mg |
| Light-sensitive layer (thickness on wet basis: 140 μm) | |
| Light-sensitive emulsion A | 73 g |
| 0.1 Wt. % dimethylformamide solution of the following sensitizing dye 1 | 2 ml |
| 0.01 Wt. % methanol solution of the following antifogging agent 1 | 2 ml |
| 0.85 Wt. % methanol solution of the following antifogging agent 2 | 10 ml |
| 0.85 Wt. % methanol solution of the following antifogging agent 3 | 10 ml |
| 4.5 Wt. % dimethylformamide solution of phthlazone | 8 ml |
| 10 Wt. % acetone solution of the following reducing agent 1 | 13 ml |

(Sensitizing Dye 1)

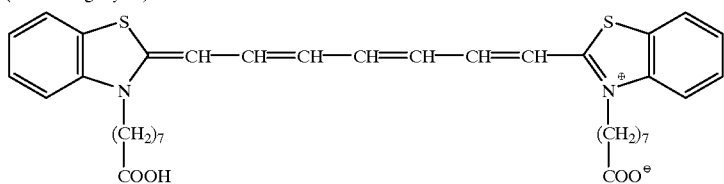

(Antifogging agent 1)

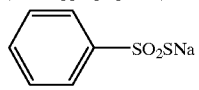

(Antifogging agent 2)

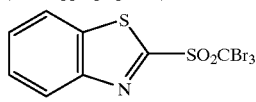

(Antifogging agent 3)

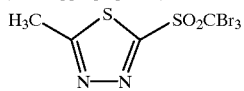

(Reducing agent 1)

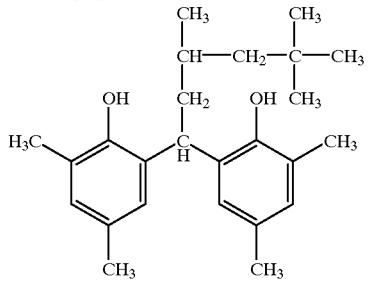

| Light sensitive layer side surface protective layer (thickness on wet basis: 100 μm) | |
|---|---|
| Acetone | 175 ml |
| 2-Propanol | 40 ml |
| Methanol | 15 ml |
| Cellulose acetate | 8.0 g |
| Phthalazine | 1.0 g |
| 4-Methylphthalic acid | 0.72 g |
| Tetrachlorophthalic acid | 0.22 g |
| Tetrachlorophthalic anhydride | 0.5 g |

Measurement of Fluorescence Spectrum

The fluorescence intensity of each sample obtained was measured by a fluorescence spectrometer (Model NIR-0818-I, Ritsu Applied Chemistry K.K.).

A Xe lamp of 300 W was used as an excitation light source. The light released from the light source was made monochromatic by the use of a 800 nm interference filter (R-76, Hoya Color Filter Glass K.K.) and a heat protection filter (R-70, Hoya Color Filter Glass K.K.). Then, the sample was irradiated with the light through a distilled water-containing flexible liquid fiber (Ultrafine Technology Co., light transmittance: 0.1), to measure the intensity of the emitted fluorescence by means of a Ge detector cooled to the liquid nitrogen temperature.

The results are set forth in Table 2, in which the fluorescence intensities of the samples at 865 nm are expressed by relative values based on the intensity of the sample 9 being 100.

Sensitometry

The heat developable light-sensitive material was cut into a half size, and exposed to a laser diode beam of 830 nm inclined by 13° from the vertical surface. Then, the light-sensitive material was subjected to heat development at 120° C. for 5 seconds using a heating drum.

Evaluation of Sharpness

The heat developable light-sensitive material was exposed to a white light of 2,856 K through an interference filter of 830 nm, and then subjected to heat development under the above-mentioned conditions. The sharpness was evaluated using the MTF value (15 lines/mm) at an optical density of 1.0.

Evaluation of Chromaticity

The sample having been subjected to heat development without performing exposure was examined on the chromaticity. The chromaticity was evaluated by the four criteria of A (good) to D (very bad).

TABLE 2

| Sample No. | Dye Kind | Dye Amount | Chromaticity | Sharpness (MTF) | Fluorescence intensity |
|---|---|---|---|---|---|
| 1 | none | — | A | 0.56 | — |
| 2 | (1) | 50 mg | A | 0.92 | 18 |
| 3 | (2) | 50 mg | A | 0.92 | 18 |
| 4 | (3) | 50 mg | A | 0.88 | 20 |
| 5 | (31) | 50 mg | A | 0.90 | 20 |
| 6 | a | 50 mg | C | 0.68 | 100 |

TABLE 2-continued

| Sample | Dye | | | Sharpness | Fluorescence |
|---|---|---|---|---|---|
| No. | Kind | Amount | Chromaticity | (MTF) | intensity |
| 7 | b | 50 mg | C | 0.67 | 102 |
| 8 | c | 50 mg | B | 0.69 | 103 |

Remarks:
The dyes a, b and c are the following dyes.

(Comparative dye a)

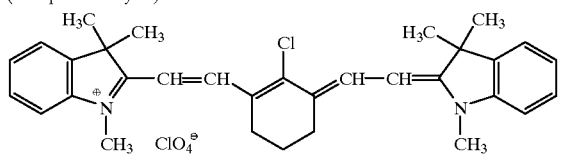

(Comparative dye b)

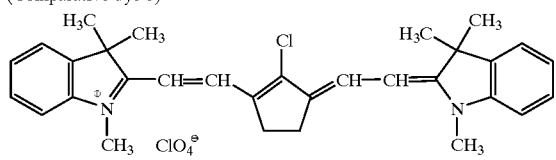

(Comparative dye c)

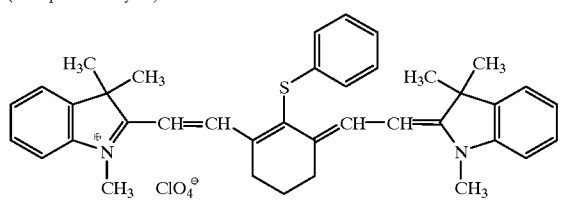

As is evident from the results set forth in Table 2, the images formed according to the present invention had low fluorescence intensity and high sharpness. The sample 8 had relatively good chromaticity but had poor sharpness.

EXAMPLE 2

Preparation of Light-sensitive Emulsion B

Solutions (1) to (6) were prepared in the following manner.

The solution (1) was prepared by mixing 131 g of stearic acid, 635 g of behenic acid with 13 liters of distilled water at 85° C. for 15 minutes.

The solution (2) was prepared by dissolving 89 g of sodium hydroxide in 1,500 ml of distilled water.

The solution (3) was prepared by mixing 19 ml of concentrated nitric acid with 50 ml of distilled water.

The solution (4) was prepared by dissolving 365 g of silver nitrate in 2,500 ml of distilled water.

The solution (5) was prepared by dissolving 86 g of polyvinyl butyral in 4,300 ml of ethyl acetate.

The solution (6) was prepared by dissolving 290 g of polyvinyl butyral in 3,580 ml of isopropanol.

Further, 0.14 mol (in terms of silver) of cubic silver iodobromide (silver iodide: 4 mol.%) grains having an average grain size of 0.06 μm were dispersed in 1,250 ml of distilled water to prepare a silver halide grain dispersion A.

To the solution (1) kept at 85° C., the silver halide grain dispersion A was added over a period of 10 minutes with vigorous stirring. Subsequently, the solution (2) was added over a period of 5 minutes. Then, the solution (3) was further added over a period of 25 minutes. The mixture was stirred for 20 minutes and cooled to 35° C. With vigorous stirring at 35° C., to the mixture was added the solution (4) over a period of 5 minutes, followed by stirring for 90 minutes.

Then, the solution (5) was added, stirring was stopped, and the mixture was allowed to stand. The aqueous phase containing a salt was drawn out to obtain an oil phase. The oil phase was desolvated, and from the resulting liquid, trace amounts of water was drawn out. Then, the solution (6) was added, and the mixture was vigorously stirred at 50° C. and further stirred for 105 minutes to obtain an emulsion B.

Preparation of Heat Developable Light-sensitive Material and Evaluation Thereof

Heat developable light-sensitive materials were prepared in the same manner as in Example 1, except that the emulsion B was used in place of the emulsion A and the antihalation layer was provided between the light-sensitive layer and the support.

The heat developable light-sensitive materials were evaluated in the same manner as in Example 1. As a result, the images formed according to the present invention had low fluorescence intensity and high sharpness, similarly to Example 1.

EXAMPLE 3

Preparation of Silver Halide Grains C

In 900 ml of water, 7.5 g of inert gelatin and 10 mg of potassium bromide were dissolved, and the solution was adjusted to pH 3.0 at 35° C. To the gelatin aqueous solution, 370 ml of an aqueous solution containing 74 g of silver nitrate and an aqueous solution containing potassium bromide and potassium iodide (94:6 by mol) and containing $K_3[IrCl_6]$ were added by a control double jet method over a period of 10 minutes with keeping pH 7.7. The amount of the $[IrCl_6]^{-3}$ ion was adjusted to $3\times10^{-7}$ mol based on 1 mol of silver.

Then, 0.3 g of 4-hydroxy-6-methyl-1,3,3a,7-tetrazaindene was added; and the mixture was adjusted to pH 5 using sodium hydroxide to obtain cubic silver iodobromide grains having an average grain size of 0.06 μm, a projected area variation coefficient of 8% and a {100} plane ratio of 87%. To the emulsion, a gelatin flocculating agent was added to perform flocculation and desalting. Then, 0.1 g of phenoxyethanol was added to adjust the grains to pH 5.9 and pAg 7.5.

Preparation of Organic Silver Salt Emulsion C 10.6 Grams of behenic acid is mixed with 300 ml of distilled water at 90° C. for 15 minutes, and to the mixture was added 31.1 ml of a 1N sodium hydroxide aqueous solution over a period of 15 minutes with vigorous stirring. The mixture was allowed to stand for 1 hour and cooled to 30° C. Then, 7 ml of a 1N phosphorus acid aqueous solution was added, and to the mixture was further added 0.13 g of the following compound C-1 with vigorous stirring. Then, the silver halide grains C were added in such an amount that the amount of the silver halide became 1.25 mmol. Further, 25 ml of a 1N silver nitrate aqueous solution was continuously added over a period of 2 minutes, and the mixture was stirred for 90 minutes. To the aqueous mixture was added 37 g of a 1.2 wt. % butyl acetate solution of polyvinyl acetate to form flocs in the dispersion, and then water is removed. Thereafter, washing with water and removal of water were further performed twice. Then, 20 g of a 2.5 wt. % solution of polyvinyl butyral (Denka Butyral #3000-K, Denki Kagaku Kogyo K.K.) in a mixed solvent (butyl acetate/isopropyl alcohol=½ by volume) was added with stirring. To the resulting gel mixture of organic acid and silver halide, 7.8 g of polyvinyl butyral (Denka Butyral #4000-2, Denki Kagaku Kogyo K.K.) and 57 g of 2-butanone were added, followed by dispersing with a homogenizer, to obtain a silver behenate emulsion containing needle grains (average minor axis: 0.06 μm, average major axis: 1 μm, coefficient of variation: 30%).

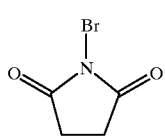
(Compound C-1)

Preparation of Coating Solution C for Forming Light-sensitive Layer

To the organic silver salt emulsion C, 25 mg of sodium phenylthiosulfonate, 25 mg of sodium phenylsulfinate, 1.0 g of calcium bromide dihydrate salt ($CaBr_2.H_2O$), 0.65 g of the following sensitizing dye 2, 2.1 g of the following compound C-2, 14.2 g of the following compound C-3, 580 g of 1-butanone, 220 g of dimethylformamide and 32 g of methanol, each being based on 1 g of silver, were added at 25° C. with stirring. The mixture was allowed to stand for 3 hours. To the mixture, 14.1 g of the following compound C-4, 125 g of the reducing agent 1 used in Example 1, 0.61 g of the following hydrazine compound H1, the dye shown in Table 3 in such an amount that the transmission absorption at 780 nm became 0.5, 1.1 g of a fluorine surface active agent (Megafax F-176P, Dainippon ink & Chemicals Inc.) and 3.7 g of polyisocyanate (Sumidur N3500, Sumitomo Bayer Urethane Co.) were added with stirring.

To the resulting mixture, a solution obtained by dissolving 45 g of cellulose acetate butyrate (CAB171-15S, Eastman Chemical Co.), 1,520 g of 2-butanone, 10 g of ethyl acetate, 50 g of dimethylformamide, 1.4 g of the following compound C-5, 11.6 g of phthalazine, 5.4 g of the following compound C-6, 4.0 g of the following compound C-7, 0.43 g of a fluorine surface active agent (Megafax F-176P, Dainippon ink & Chemicals Inc.), 1.2 g of spherical silica particles having an average particle size of 3 μm (Cildex H31, Tokai Kagaku K.K.) and 0.42 g of polyisocyanate (Sumidur N3500, Sumitomo Bayer Urethane Co.) in 4.2 g of ethyl acetate was added.

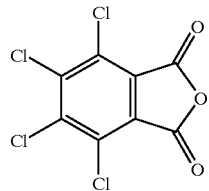
(Compound C-5)

(Sensitizing dye 2)
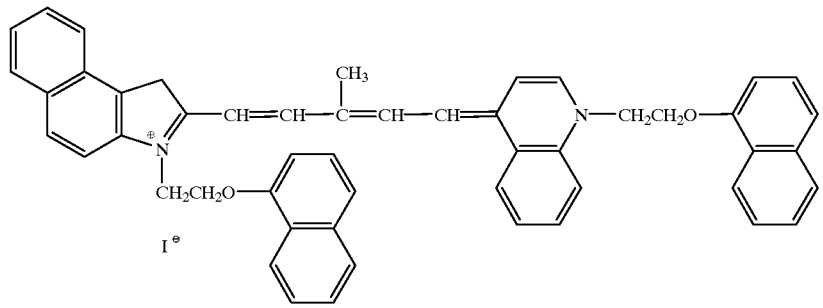

(Compound C-2)
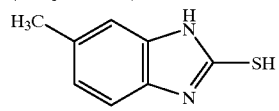

(Compound C-3)
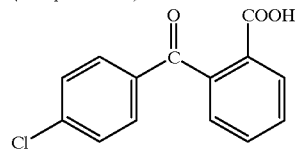

(Compound C-4)
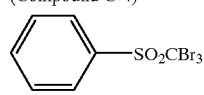

(Hydrazine compound H-1)
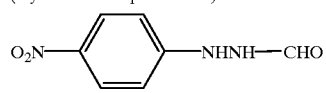

-continued (Compound C-6)

H₃C—⟨benzene ring⟩—COOH, COOH (Compound C-7)

Cl, Cl, Cl, Cl-substituted benzene with two COOH groups

Preparation of Support Having Backing Layer

To 64 g of 2-propanol, 6 g of polyvinyl butyral (Denka Butyral #4000-2, Denki Kagaku Kogyo K.K.), 0.2 g of spherical silica particles having an average particle size of 12 μm (Cildex H51, Tokai Kagaku K.K.), 0.2 g of spherical silica particles having an average particle size of 5 μm (Cildex H51, Tokai Kagaku K.K.) and 0.1 g of a fluorine surface active agent (Megafax F-176P, Dainippon ink & Chemicals Inc.) were added with stirring, followed by mixing or dissolving. Further, a solution obtained by dissolving the dye shown in Table 3 in such an amount that the transmission absorption at 780 nm became 0.7 in a mixed solvent consisting of 10 g of methanol, 20 g of acetone and 20 g of dimethylformamide and a solution obtained by dissolving 0.8 g of polyisocyanate (Sumidur N3500, Sumitomo Bayer Urethane Co.) in 6 g of ethyl acetate were added, to form a coating solution for forming a backing layer.

Each surface of a polyethylene terephthalate support was provided with a moisture-proof undercoating layer containing polyvinylidene chloride. Then, one side surface of the support was coated with the coating solution for forming a backing layer in such an amount that the optical density at 780 nm became 0.7.

Preparation of Light-sensitive Layer and Surface Protective Layer

The surface of the support, where no backing layer was provided, was coated with the coating solution C for forming a light-sensitive layer in an amount of 1.6 g/m² (in terms of silver) to form a light-sensitive layer. Then, the surface of the light-sensitive layer was coated with the coating solution for forming a surface protective layer prepared in Example 1 in such an amount that the dry film thickness became 1.8 μm.

Image Formation and Evaluation

The heat developable light-sensitive material was exposed under the following conditions (1) or (2) and then subjected to heat development at 115° C. for 25 seconds using a heating drum.

(1) The heat developable light-sensitive material was exposed to a xenon flash light (light emission time: $10^{-4}$ second) through an interference filter having a peak at 780 nm and a step wedge.

(2) The heat developable light-sensitive material was exposed to a xenon flash light (light emission time: $10^{-4}$ second) through an interference filter having a peak at 780 nm, a step wedge and a tint screen having a dot area ratio of 50%.

Separately, without performing the exposure, the heat developable light-sensitive material was directly subjected to heat development at 115° C. for 25 seconds using a heating drum.

The obtained image was evaluated on the gradation, dot area ratio, spectral absorption and chromaticity in the following manner.

(1) Gradation

From the results of measurement of the sample having been subjected to the exposure under the above conditions (1) and to the heat development, the gradation (G0330) was determined. G0330 means inclination between the density 0.3 and the density 3.0.

(2) Dot area ratio

From the results of measurement of the sample having been subjected to the exposure under the above conditions (2) and to the heat development, the absolute value of a difference between S50 and S60 described below was determined.

S50: -log (reciprocal of the exposure quantity necessary for obtaining dot area ratio of 50%) S50: -log (reciprocal of the exposure quantity necessary for obtaining dot area ratio of 60%)

As the difference between S50 and S60 (ΔS(50-60)) becomes larger, the variation of the dot area ratio by the exposure quantity becomes smaller, and an image having large difference is preferable.

(3) Spectral absorption

The spectral absorption of the sample having been subjected to no exposure was measured to obtain absorbance at 360 nm and 410 nm. Then, a difference in the density between the obtained absorbance and an absorbance of the sample containing no dye at each wavelength was calculated. The wavelengths 360 nm and 410 nm correspond to a printing wavelength of a printer light source for PS size and that of a printer light source for returning, respectively. The image having a small value for the difference can be printed for a short period of time, and is preferable.

(4) Chromaticity

The chromaticity was evaluated in the same manner as in Example 1.

The results are set forth in Table 3.

TABLE 3

| Sample No. | Dye | G0330 | ΔS (50–60) | Spectral absorption 360 nm | 410 nm | Chromaticity |
|---|---|---|---|---|---|---|
| 101 | (2) | 15 | 0.75 | 0.07 | 0.10 | A |
| 102 | (3) | 14 | 0.78 | 0.07 | 0.11 | A |
| 103 | (19) | 14 | 0.76 | 0.07 | 0.11 | A |
| 104 | (31) | 15 | 0.76 | 0.07 | 0.11 | A |
| 105 | a | 15 | 0.55 | 0.09 | 0.14 | C |
| 106 | c | 14 | 0.57 | 0.08 | 0.12 | B |
| 107 | d | 15 | 0.56 | 0.16 | 0.14 | C |
| 108 | e | 14 | 0.61 | 0.12 | 0.23 | D |
| 109 | none | 16 | <0.1 | — | — | A |

Remarks:
The dyes a and c are the same dyes as described above. The dyes d and e are the following dyes.
(Comparative dye d)

TABLE 3-continued

| Sample | | ΔS | Spectral absorption | | |
|---|---|---|---|---|---|
| No. | Dye | G0330 (50–60) | 360 nm | 410 nm | Chromaticity |

(Comparative dye e)

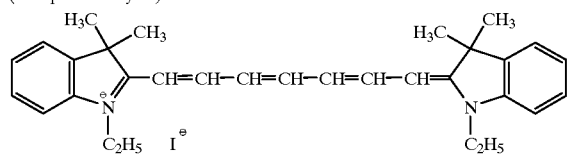

As is evident from the results set forth in Table 3, the images of the samples 105 to 108 had small variation of G0330 and had hard gradation. Further, they had high absorption at 360 nm and 410 nm and had large variation of the dot area ratio. Therefore, the samples 105 to 108 were unfavorable. On the other hand, the images of the samples 101 to 104 according to the present invention had low absorption at 360 rum and 410 nm and had small variation of the dot area ratio by the exposure quantity. The dot area ratio of small value resulted from small fluorescence of the dye.

EXAMPLE 4

Heat developable light-sensitive materials were prepared in the same manner as in Example 3, except that the hydrazine compound H-1 was replaced with each of the following hydrazine compounds H-2 to H-4 and the amount of each compound was adjusted so that the inclination of the density measured in the gradation (3) of Example 3 was within the range of the result of Example 3.

The heat developable light-sensitive materials were evaluated in the same manner as in Example 3. As a result, the images formed according to the present invention had favorable results similarly to Example 3.

(Hydrazine compound H-2)

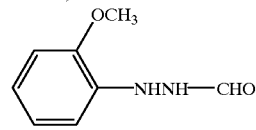

(Hydrazine compound H-3)

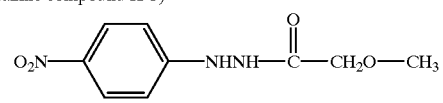

(Hydrazine compound H-4)

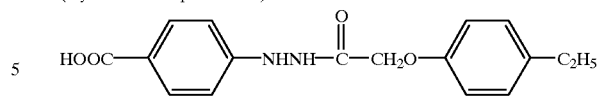

We claim:
1. A heptamethine cyanine compound represented by the formula (IIa):

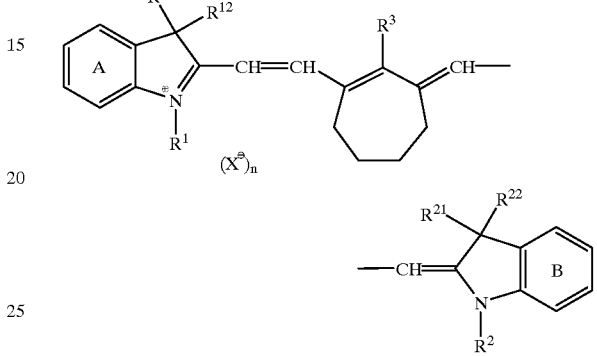

(IIa)

in which each of $R^1$ and $R^2$ independently is an alkyl group, a substituted alkyl group, an alkenyl group, a substituted alkenyl group, an aralkyl group or a substituted aralkyl group; $R^3$ is cyano, $-SO_2R^{31}$, $-OR^{32}$ or $-SR^{33}$; each of $R^{11}$, $R^{12}$, $R^{21}$ and $R^{22}$ independently is an alkyl group, or $R^{11}$ and $R^{12}$ or $R^{21}$ and $R^{22}$ are combined with each other to form a saturated aliphatic spiro ring; each of $R^{31}$, $R^{32}$ and $R^{33}$ independently is an alkyl group, a substituted alkyl group, a cycloalkyl group, a substituted cycloalkyl group, an aralkyl group, a substituted aralkyl group, an aryl group, a substituted aryl group, a heterocyclic group or a substituted heterocylcic group; each of the benzene rings A and B may be independently condensed with another benzene ring, and the benzene rings A and B and their condensed rings may further have a substituent group; X is an anion; and n is 0 or 1.

2. The heptamethine cyanine compound as claimed in claim 1, wherein each of $R^1$ and $R^2$ independently is an alkyl group, a substituted alkyl group, an aralkyl group or a substituted aralkyl group.

3. The heptamethine cyanine compound as claimed in claim 2, wherein each of $R^1$ and $R^2$ independently is an alkyl group or a substituted alkyl group.

4. The heptamethine cyanine compound as claimed in claim 1, wherein $R^3$ is $-SO_2R^{31}$, $-OR^{32}$ or $-SR^{33}$.

5. The heptamethine cyanine compound as claimed in claim 4, wherein $R^3$ is $-OR^{32}$ or $-SR^{33}$.

* * * * *